United States Patent
Raghuram et al.

(10) Patent No.: US 8,855,596 B2
(45) Date of Patent: Oct. 7, 2014

(54) METHODS AND APPARATUS FOR PLACEMENT OF AN EMERGENCY CALL

(75) Inventors: Sharada Raghuram, Buffalo Grove, IL (US); Donald A. Dorsey, Vernon Hills, IL (US); Rohini Polisetty, Grayslake, IL (US)

(73) Assignee: Motorola Mobility LLC, Libertyville, IL (US)

( * ) Notice: Subject to any disclaimer, the term of this patent is extended or adjusted under 35 U.S.C. 154(b) by 854 days.

(21) Appl. No.: 11/004,520

(22) Filed: Dec. 3, 2004

(65) Prior Publication Data

US 2006/0121877 A1     Jun. 8, 2006

(51) Int. Cl.
*H04M 11/04*     (2006.01)
*H04W 24/00*     (2009.01)
*H04W 76/00*     (2009.01)
*H04W 4/22*      (2009.01)

(52) U.S. Cl.
CPC ............. *H04W 4/22* (2013.01); *H04M 11/04* (2013.01); *H04W 76/007* (2013.01)
USPC ..................................... 455/404.2; 455/456.1

(58) Field of Classification Search
USPC ......... 455/404.1, 456.1, 448, 404.2; 370/216, 370/310
See application file for complete search history.

(56) References Cited

U.S. PATENT DOCUMENTS

| | | | | |
|---|---|---|---|---|
| 6,115,599 A * | 9/2000 | Stilp | ............................ | 455/404.1 |
| 6,697,630 B1 | 2/2004 | Corwith | | |
| 7,031,725 B2 * | 4/2006 | Rorabaugh | ................ | 455/456.1 |
| 2003/0096614 A1 * | 5/2003 | Paila | .............................. | 455/450 |
| 2003/0114158 A1 * | 6/2003 | Soderbacka et al. | .......... | 455/436 |
| 2004/0242191 A1 * | 12/2004 | Hossain et al. | ............. | 455/404.1 |
| 2006/0153342 A1 * | 7/2006 | Sasaki | ............................. | 379/37 |
| 2006/0209675 A1 * | 9/2006 | Jacobson | ....................... | 370/216 |

FOREIGN PATENT DOCUMENTS

| | | |
|---|---|---|
| WO | 98/46035 A1 | 10/1998 |
| WO | 03/096727 A1 | 11/2003 |
| WO | WO 2005/004526 * 1/2005 | ............... H04Q 7/38 |

OTHER PUBLICATIONS

International Search Report dated Jun. 12, 2006 for International Application No. PCT/US2005/039721, p. 1.
Russian Decision on Grant; Russian Application No. 2007125127/09; dated Nov. 23, 2009.
EP Oral Proceedings Summons; EP Application No. 05825012.7; dated Dec. 10, 2009.
EP Office Action; EP Application No. 05825012.7; dated Oct. 16, 2007.
Chinese Office Action; Chines Application No. 200580040017.9; dated Sep. 4, 2009.

* cited by examiner

*Primary Examiner* — Michael Faragalla
(74) *Attorney, Agent, or Firm* — Morris & Kamlay LLP

(57) ABSTRACT

Emergency call placement methods and apparatus for a user equipment in a wireless network are disclosed. The placement method includes detecting initiation of an emergency call during a non-idle connection mode of the user equipment (204), terminating the non-idle connection mode (206) and initiating a new connection for the emergency call (208). This method allows the new connection to use a location methodology to locate the user equipment in response to the emergency call. The disclosed wireless user equipment (102, 500) is configured to implement the disclosed method.

18 Claims, 5 Drawing Sheets

METHODS AND APPARATUS FOR PLACEMENT OF AN EMERGENCY CALL

FIELD OF THE DISCLOSURE

This disclosure relates generally to telecommunication, and more particularly to methods and apparatus for placing emergency calls on user equipment within a wireless telecommunication system.

BACKGROUND OF THE DISCLOSURE

Currently, the Federal Communications Commission (the "FCC") is advancing location technology that enables emergency services to locate the geographic position of a mobile phone. This technology requirement has become known as Enhanced 911 or E911, for short. Different wireless communication systems or Radio Access Technologies (RATs) currently employ different location determination methods in order to effect E911 calls. For example, the Global System for Mobile Communication (i.e., "GSM") standard and associated systems, although capable of supporting various location methods, typically support Uplink Observed Time Difference of Arrival (i.e., "UTDOA") for location determination. On the other hand, the more recently deployed Universal Mobile Telephone Standard (i.e., UMTS) or 3GPP specification (3G) systems typically support Assisted Global Positioning System ("AGPS") for location determination.

In certain geographic locations such as North America, however, early deployment of 3G systems may not support AGPS. This is due, in part, to the lack of current infrastructure and increased costs incumbent with AGPS. Thus, in order to still support E911 capability, cellular operators have proposed to use the already defined "Inter_RAT redirection procedure" set forth in section 25.331 of the 3GPP specification (3GPP TS 25.331) to move mobile stations or user equipment (UE) that do not support AGPS from Wideband Code Division Multiple Access (WCDMA) technology used by 3G to a different Radio Access Technology (RAT) that supports E911 location determination without needing AGPS. In particular, cellular operators propose moving UEs from 3G to GSM during an E911 call in order to locate UEs using UTDOA or another location methodology (which may include AGPS).

If a user initiates an emergency call while the user equipment is presently connected in a connected mode (e.g., the UE is in the middle of a packet session or is conducting a location update or routing area update) in a WCDMA cell, the user equipment will not send an RRC connection request, which is needed to initiate the redirection procedure according to the 3GPP standard (e.g., section 8.1.3.9 of the 3GPP TS 25.331 specification, V5.8.0, March 2004-03). Rather, the UE will use the existing connection and send a Non Access Stratum (NAS) message (e.g., a Connection Management Service Request) through an initial direct transfer message in accordance with the 3GPP specification. The result of following 3GPP specification procedures in this scenario, unfortunately, is that the 3G wireless network cannot redirect the user equipment to a GSM system (e.g., a different radio access technology), for example, to enable location determination by a GSM network. Therefore, it is desirable to ensure that a UE, which is initiating an emergency call when the UE is in WCDMA connected mode, initiate the redirection procedure to GSM in order to enable location determination of the UE.

Various aspects and features of the disclosure will become more fully apparent to those having ordinary skill in the art upon consideration of the following drawings and accompanying detail description wherein like reference numerals represent like operations or structure.

DETAILED DESCRIPTION OF THE PRESENT EXAMPLES

The present disclosure describes an emergency call placement method for user equipment (UE) where the UE detects initiation of an emergency call placed via a first radio access technology (e.g., via a WCDMA network or other suitable network) during an existing or non-idle connection mode. The UE then terminates the existing connection mode and initiates a new connection for the emergency call. This method allows the UE to issue an RRC connection request to a wireless communication network operating, for example, according to the 3GPP specification such that the network may initiate a redirection procedure that, in turn, effects establishment of the emergency call on a second radio access technology (e.g., a GSM network or other suitable network) to perform device location using UTDOA location method.

Figure 1:
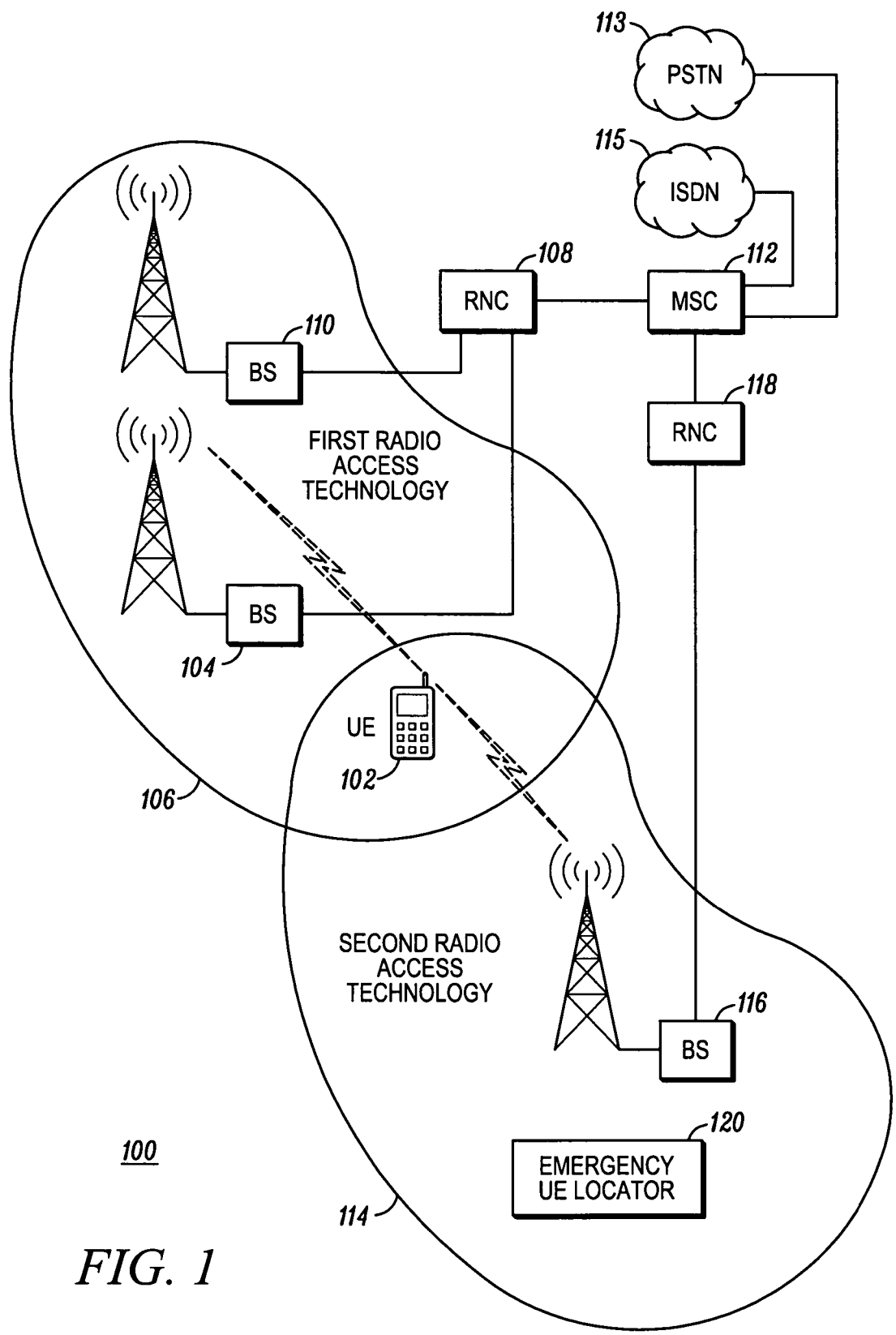
FIG. 1 illustrates a simplified diagram of a mobile communication system according to a disclosed example.

FIG. 1 shows a simplified diagram of a mobile communication system 100 according to a disclosed example. In this system 100, a user equipment (UE) 102 communicates wirelessly with at least one base station (BS) operating according to a first radio access technology (RAT). In the example shown in FIG. 1, the user equipment 102 communicates with a base station 104 operating according to a first radio access technology with geographic coverage diagrammatically illustrated by an area 106. In this example, the first radio access technology is WCDMA pursuant to the 3G standard. In general for purposes of this disclosure, it is noted that the term Radio Access Technology (RAT) can be considered to include not only the technology standards employed within a network, but also refers to physical characteristics (e.g., multiplexing technology, modulation schemes, channel bandwidth) through which different elements in the wireless network communicate. A radio network controller (RNC) manages one or more base stations operating according to the first RAT. In this example, RNC 108 manages base station 104 and at least one other base station 110. The radio network controller 108 and its associated base stations 104 and 110 make up the radio access network (RAN) operating according to a first radio access technology.

The radio access network may be, in turn, connected to a mobile switching center (MSC) 112 that allows connection to circuit switched networks, for example, such as a public switch telephone network (PSTN) 113 or an integrated services digital network (ISDN) 115. MSC 112, for purposes of the disclosed example, is also connected to another radio network employing a second radio access technology such as GSM. It is noted, however, that each radio access network or radio access technology may have a shared mobile switching center as illustrated or may have a separate mobile switching centers.

In the example of FIG. 1, the user equipment 102 is also connectable to the second radio access technology (RAT), such as another network using a different radio access technology, indicated by area 114. The second radio access network 114 includes one or more base stations 116, only one of which is shown in FIG. 1 for illustrative purposes. This base station 116 and the other base stations (not shown) are connected to a radio network controller RNC 118, which, in turn, connect to mobile switching center MSC 112. The second radio access network employing the second radio access technology further includes an emergency UE locator 120. It is noted that this locator 120 is conceptually shown as a block within the second radio access technology area and may be implemented as either hardware, firmware or software in either a base station (e.g., base station 116), the radio network controller RNC 118 or some other device that implements the second radio access technology. In this example, where the second radio access technology is GSM, the emergency UE locator 120 employs an Uplink Observed Time Difference of Arrival (UTDOA) for location of UEs in the GSM network.

Figure 2:
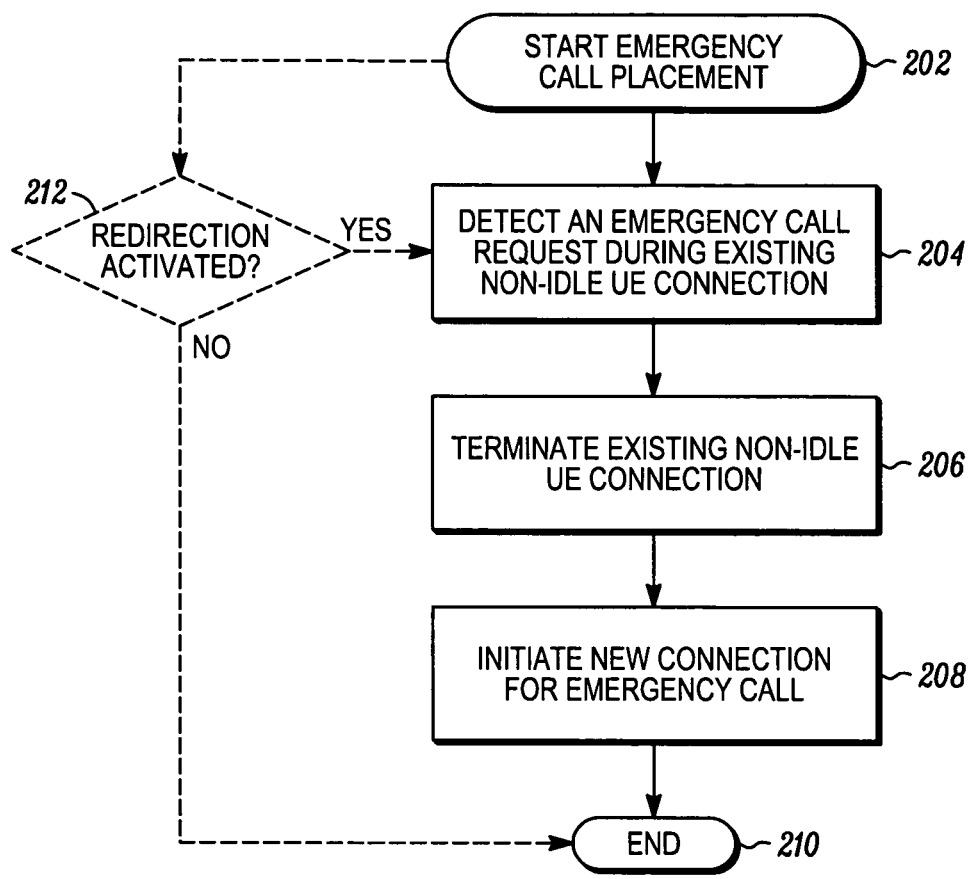
FIG. 2 illustrates a flow chart diagram of an emergency call placement method performed in a LE according to a disclosed example.

FIG. 2 illustrates a flow chart diagram 200 of an emergency call placement method performed in a UE according to a disclosed example. For purposes of this example, the method will be described in connection with the user equipment 102 shown in FIG. 1, which is initially camped on base station 104 using WCDMA radio access technology. It will be recognized, however, that the method may be employed by any suitable device or system or subsystem or shared among multiple devices. As indicated in block 202, an emergency call placement is started in UE 102 during an existing or non-idle connection mode. It is noted that non-idle or existing connection mode refers to when the UE 102 is at least one of in a packet session, performing a location update or performing a routing area update. Emergency call placement occurs when a user presses 9-1-1 or an emergency button on the UE 102. UE 102 then detects the emergency call request as shown in block 204, and subsequently terminates the existing connection as shown in block 206. After termination, the UE 102 initiates a new connection to the base station 104 for the emergency call with another radio resource control connection request in block 208. The emergency call placement procedure ends as shown in block 210.

Alternatively, a network operator may have the capability of activating and deactivating the redirection feature for emergency calls based on a bit allocated in the non volatile memory of the UE 102, which could be used to activate/deactivate this feature. The network operator desiring to use "emergency call redirection" may activate this feature by turning on this bit in the UE 102, for example. This alternative is illustrated by decision block 212 in FIG. 2, which is interposed in the process between blocks 202 and 204. Thus in this alternative example, flow no longer proceeds from block 202 to 204, but rather from block 202 to block 212. In block 212, specifically, the UE 102 determines whether redirection has been activated within the device 102. If not, then the procedure ends at block 210. If, however, redirection has been activated, flow proceeds to block 204 where the method proceeds as discussed above.

This procedure thereby allows the network using the first radio access technology network, namely a 3G network, to initiate procedures under the 3GPP specification to redirect the UE 102 to a second RAT technology for determining UE location. The entire procedure from initiation to end (i.e., placement of the E911 call causing UE location determination) is illustrated in the message sequence chart of FIG. 3.

Figure 3:
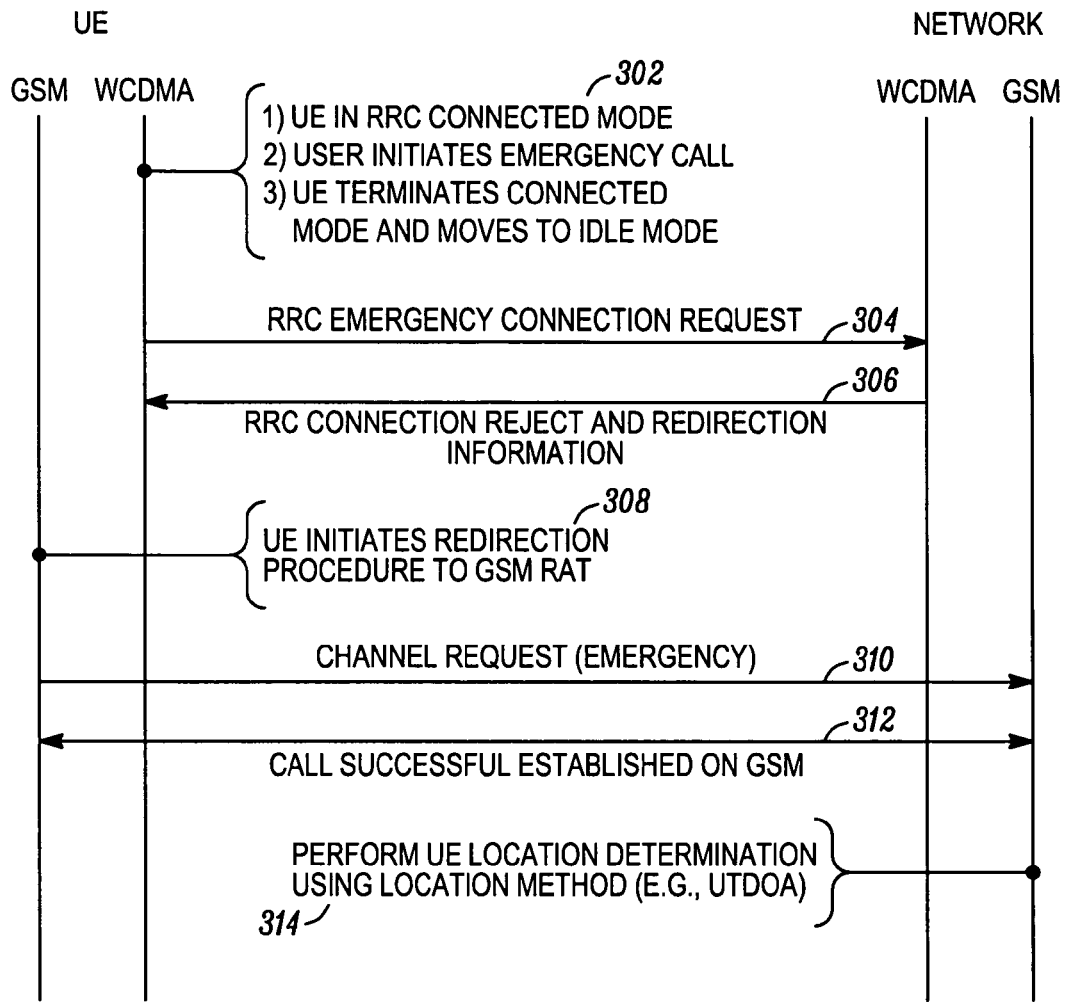
FIG. 3 illustrates a message sequence chart showing an emergency call placement sequence according to the disclosed example.

As illustrated, FIG. 3 shows a message sequence chart 300 showing an emergency call placement sequence according to a disclosed example. At the start of the procedure, the UE is in a WCDMA radio resource control (RRC) connected mode to a base station, such as BS 104, as indicated by reference number 302. The user of the UE then initiates an emergency call. Next, the UE terminates the WCDMA connected mode and temporarily moves to WCDMA idle mode. After entering idle mode, the UE then sends an RRC emergency connection request 304 to the network (e.g., through base station 104 as illustrated in FIG. 1).

As shown in FIG. 3, this request is made according to the 3GPP specification utilizing WCDMA. On the network side, an RRC connection reject message 306 is sent to the UE in accordance with the 3GPP specification. In particular, the connection reject message includes redirection information concerning the presence of a second radio access technology (e.g., GSM). This message includes, for example, an "Inter_RAT" information message according to the 3GPP specification directing the UE to search for suitable second radio access technology or "Inter_RAT" cell. The UE uses this information to initiate a connection to the suitable second radio access technology (RAT) that the UE finds. In the specific disclosed example, the UE initiates a redirection procedure to GSM radio access technology, as indicated by reference number 308. As part of this process, the UE may measure the signal power of the GSM network and subsequently synchronize to a GSM cell from a current neighbor list, which is self-determined by the UE. This part of the procedure, however, may be omitted if the UE was already synchronized to cells from the neighbor list prior to redirection. Additionally, the UE may collect system information read from the GSM cell and select the most suitable second RAT (e.g., GSM) over which to establish an emergency call.

Next, the UE then establishes the emergency call via the GSM radio access technology by issuing a channel request 310 indicating that the cause is an emergency call. Afterward, the call is successfully established between the UE and the network using GSM radio access technology as indicated by the arrow 312. After the call has been successfully established, UE location determination is performed using location methods particular to the second radio access technology. In this example, the GSM network will utilize a signal time of arrival location method such as UTDOA as indicated by reference number 314.

Figure 4:
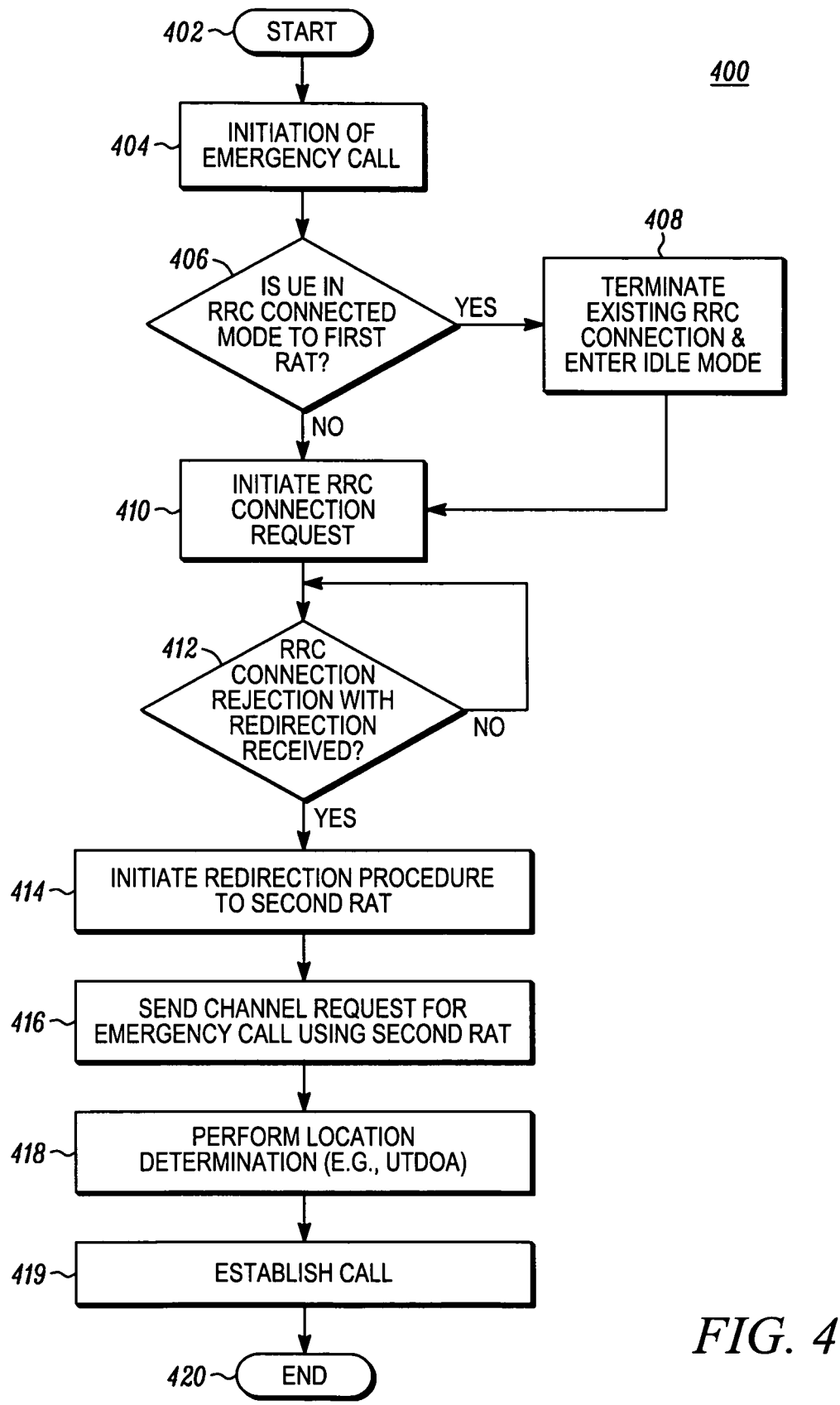
FIG. 4 illustrates a flow chart diagram of an emergency call placement method to perform the sequence illustrated in FIG. 3.
Figure 5:
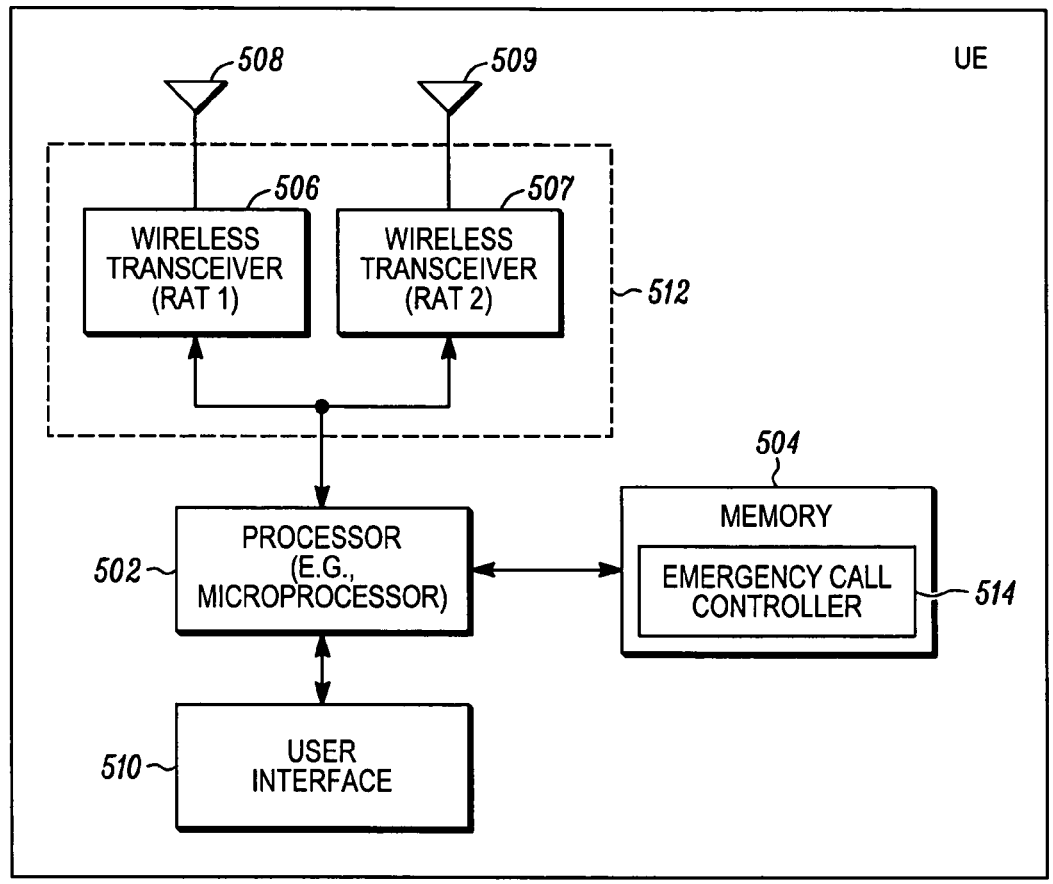
FIG. 5 illustrates a system diagram of user equipment according to a disclosed example.

FIG. 4 illustrates a flow chart diagram of an emergency call placement method to perform the sequence illustrated in FIG. 4. This process may be executed by a processor in the UE 500 shown in FIG. 5. Referring to FIG. 4, after initialization as shown in block 402, a user initiates an emergency call as shown at input block 404. This user initiation may be effected by inputting information to the processor 502 via a user interface 510, as shown in FIG. 5 and discussed below. The process of FIG. 4 then proceeds to decision block 406 where a determination is made whether the UE is in an RRC connected mode to a first radio access technology. If the UE 500 is not in a connected mode, then the device may simply initiate an RRC connection request as shown in block 410. If, however, the UE is already connected, the existing RRC connection is terminated and the UE 102 is placed into an idle mode as indicated in block 408. The device then initiates a second or new RRC connection request as shown in block 410. Flow then proceeds to decision block 412 where the device waits to determine if an RRC connection rejection with "Inter_RAT" information is received. Once the rejection with "Inter_RAT" information (i.e., redirection) is received, flow then proceeds to block 414 where the UE 102 initiates a redirection procedure to a second radio access technology as instructed by the RRC connection rejection with redirection. Included within this redirection procedure may be synchronization to the second radio access technology cell and collection of system information as was described previously with respect to FIG. 3.

Next, a channel request is sent by the UE 500 utilizing the second radio access technology (e.g., GSM) for the emergency call. After the network utilized by the second radio access technology responds, location determination is then employed by the network using the second radio access technology and the channel request signal received in block 416 to locate the UE 500 in response to the emergency call as indicated in block 418. The UE reciprocates and establishes a call as indicated in block 419. Once a call is established, the procedure ends as indicated at block 420.

FIG. 5 illustrates a system diagram of user equipment according to a disclosed example, such as user equipment 102 shown in FIG. 1. As shown, a user equipment 500 includes a processor 502 that is configured to execute the emergency call procedure of the present disclosure, which instructions may be stored in a storage medium such as memory 504. It is noted that the processor 502 and memory 504 may be integral or separate and that the emergency call procedure of the present disclosure may be implemented as software, firmware, or dedicated hardware within the processor 502, or in any suitable manner.

The UE 500 also includes first and second wireless transceivers 506 and 507 connected to respective antennas 508 and 509, the first transceiver 506 being configured to operate according a first radio access technology and the second transceiver being configured to operate according to a second radio access technology. The first and second transceivers 506, 507 may be housed or combined as a single transceiver 512 as shown in FIG. 5 configured to utilize a plurality of radio access technologies.

The UE 500 also includes a user interface 510 allowing a user to input information, such as the initiation of an emergency call. As is also typical with most mobile devices, the user interface may include a display by which the processor 502 may display information to a user. The user interface 510 may also include a keypad, microphone, loudspeaker, and a panic or emergency button, as examples. The UE 500 may also include an emergency call controller 514 containing dedicated software for performing the previously described procedure of FIGS. 2-4 that can be implemented as software in the memory 504 or the processor 502, or also implementable with hardware or firmware.

In operation, the illustrated components of UE 500 perform the emergency call procedure disclosed. In particular, user interface 510 is configured to receive input information from the user, such as input of an emergency call, and supply the input information to the processor 502. The processor 502 is then configured to recognize the emergency call input. In particular, the transceiver 506 is configured to recognize an emergency call input while it is in an existing connection mode using a first radio access technology. The processor then initiates termination of the existing connection mode of the transceiver 506 and causes the UE 500 to enter the first RAT idle mode. After entering the idle mode, the processor 502 signals the transceiver 506 to issue a connection request to the first radio access technology network including information indicating that the cause of the connection request is an emergency call.

Moreover, the processor 502 is also further configured to recognize the RRC connection rejection from the first RAT network received via the transceiver 506 and initiate a redirection procedure such as the redirection procedure mandated by the 3GPP specification. The processor 502 then will signal the second transceiver 507 to establish a channel request for a new connection using a second radio access technology in which the transceiver 507 is designed to operate.

As described, the disclosed methods and apparatus provide an emergency call placement methodology that allows a user equipment operating in an existing connection mode particularly in 3G systems to avoid the scenario where the 3G network cannot redirect the UE to another radio access technology to perform a location determination for emergency calls. This is accomplished by providing a UE apparatus and method that terminate the existing call and initiate a new connection request such that the network will respond according to the prescribed protocol under the 3GPP specification.

While this disclosure includes what are considered presently to be the preferred examples and best mode described in a manner that established possession of the invention by the inventors and that enables those of ordinary skill in the art to make and use the invention, it is understood that there are many equivalents to the disclosed examples and that modifications and variations may be made without departing from the scope and the spirit of the invention, which are not limited by the disclosed examples, but by the appended claims, including any amendments made during the pendency of this application and all equivalents of those claims as issued.

It is further understood that the disclosed methods and apparatus used terminology of 3G wireless communication networks and GSM wireless communication networks. However, other wireless communication networks can implement the disclosed methods and apparatus.

It is further understood that the disclosed functions and principles are preferably implemented within software programs or instructions. Nonetheless, one of ordinary skill in the art, notwithstanding possibly significant effort in many design choices motivated by, for example, available time, current technology, and economic considerations, when guided by the concepts and principles disclosed herein will be readily capable of generating such software instruction and programs with minimal experimentation.

What is claimed is:

1. An emergency call placement method for user equipment comprising:
   detecting initiation of an emergency call received from a user interface of the user equipment during a first non-idle connection to a cell using a first radio access technology;
   terminating the first non-idle connection by the user equipment in response to detecting initiation of the emergency call and entering an idle mode on the cell;
   transmitting a connection request on the cell for the emergency call via the first radio access technology, without performing an intervening search;
   receiving a reply specific for the user equipment for the emergency call via the first radio access technology in response to the connection request, the reply containing information for connecting using a second radio access technology; and
   establishing a second connection for the emergency call using the second radio access technology.

2. The method as defined in claim 1, wherein the connection request includes a radio resource control connection request containing information concerning the emergency call.

3. The method as defined in claim 1, wherein terminating the first connection further comprises entering an idle mode of the user equipment prior to establishing the second connection.

4. The method as defined in claim 1, wherein the emergency call includes a requirement for location determination of the user equipment call.

5. The method as defined in claim 1, wherein the first radio access technology is wideband code division multiplex access (WCDMA).

6. The method as defined in claim 1, wherein the second radio access technology is Global System for Mobile Communication (GSM).

7. An emergency call placement method comprising:
detecting initiation of an emergency call by user equipment during a first connection between the user equipment and a cell of a communication network using a first radio access technology;
terminating the first connection at the user equipment and entering an idle mode on cell in response to detecting initiation of the emergency call;
establishing a second connection on the cell for the emergency call via the first radio access technology from the user equipment to the network, without performing an intervening search;
receiving a reply from the network through the cell at the user equipment via the first radio access technology in response to the second connection, the reply containing information specific for the user equipment for the emergency call for connecting to a second radio access technology;
establishing a third connection between the user equipment and the network for the emergency call via the second radio access technology; and
determining a position of the user equipment via a location methodology employed by the second radio access technology.

8. The method as defined in claim 7, wherein establishing a second connection comprises transmitting a radio resource control connection request including information concerning the emergency call.

9. The method as defined in claim 7, wherein terminating the first connection mode further comprises entering an idle mode of the user equipment prior to establishing the second connection.

10. The method as defined in claim 7, wherein the emergency call includes a requirement for location determination of the user equipment call.

11. The method as defined in claim 7, wherein the first radio access technology is wideband code division multiplex access (WCDMA).

12. The method as defined in claim 7, wherein the second radio access technology is Global System for Mobile Communication (GSM).

13. The method as defined in claim 7, wherein the location methodology is Uplink Observed Time Difference of Arrival (UTDOA).

14. Wireless user equipment comprising:
a transceiver configured to connect to a wireless communication network using a plurality of radio access technologies;
a user interface configured to receive input information;
a processor configured to recognize an emergency call input to the user interface during an existing connection mode of the transceiver using a first radio access technology, signal the transceiver to terminate an existing connection mode and enter an idle mode in response to the emergency call input, and signal the transceiver to issue a connection request to the network using the first radio access technology; and
wherein the connection request comprises a radio resource control connection request including information concerning the emergency call.

15. The wireless user equipment as defined in claim 14, wherein the first access technology is wideband code division multiplex access (WCDMA).

16. The wireless user equipment as defined in claim 14, wherein the processor is further configured to recognize a rejection from the network in response to the issued connection request and initiate a redirection procedure to signal the transceiver to establish a new connection using a second radio access technology.

17. The wireless user equipment as defined in claim 16, wherein the second radio access technology is Global System for Mobile Communication (GSM).

18. The wireless user equipment as defined in claim 16, wherein the emergency call includes a requirement for location determination of the user equipment call.

* * * * *